April 19, 1938.  L. ROSEMAN  2,114,430
LOCKING SNAP FASTENER
Filed Dec. 2, 1936  3 Sheets-Sheet 1
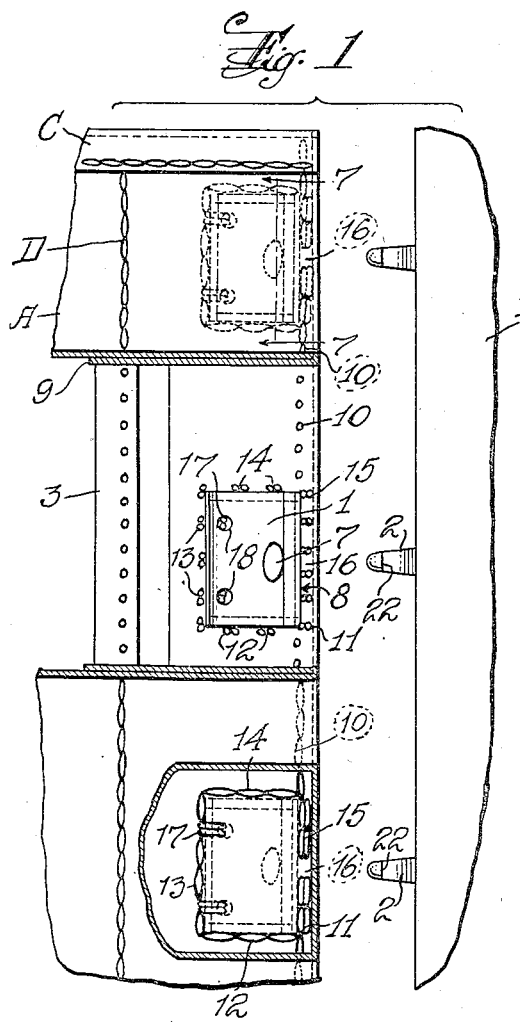
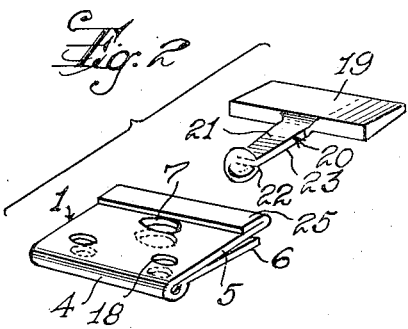
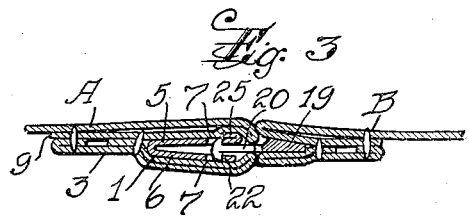
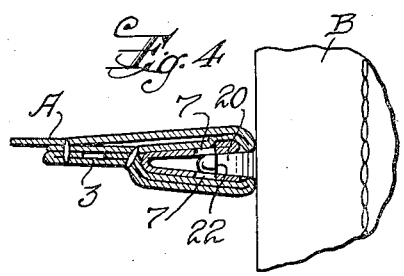
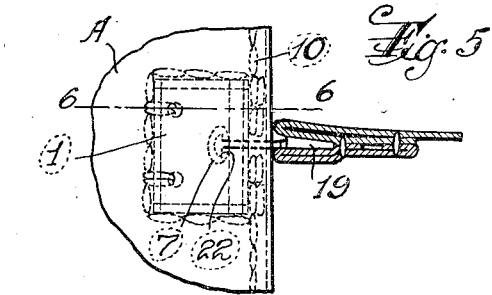
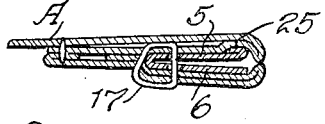
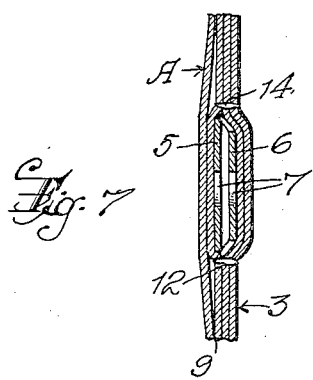
INVENTOR
Leo Roseman
BY Harry B. Rook
ATTORNEY April 19, 1938.   L. ROSEMAN   2,114,430
LOCKING SNAP FASTENER
Filed Dec. 2, 1936   3 Sheets-Sheet 2
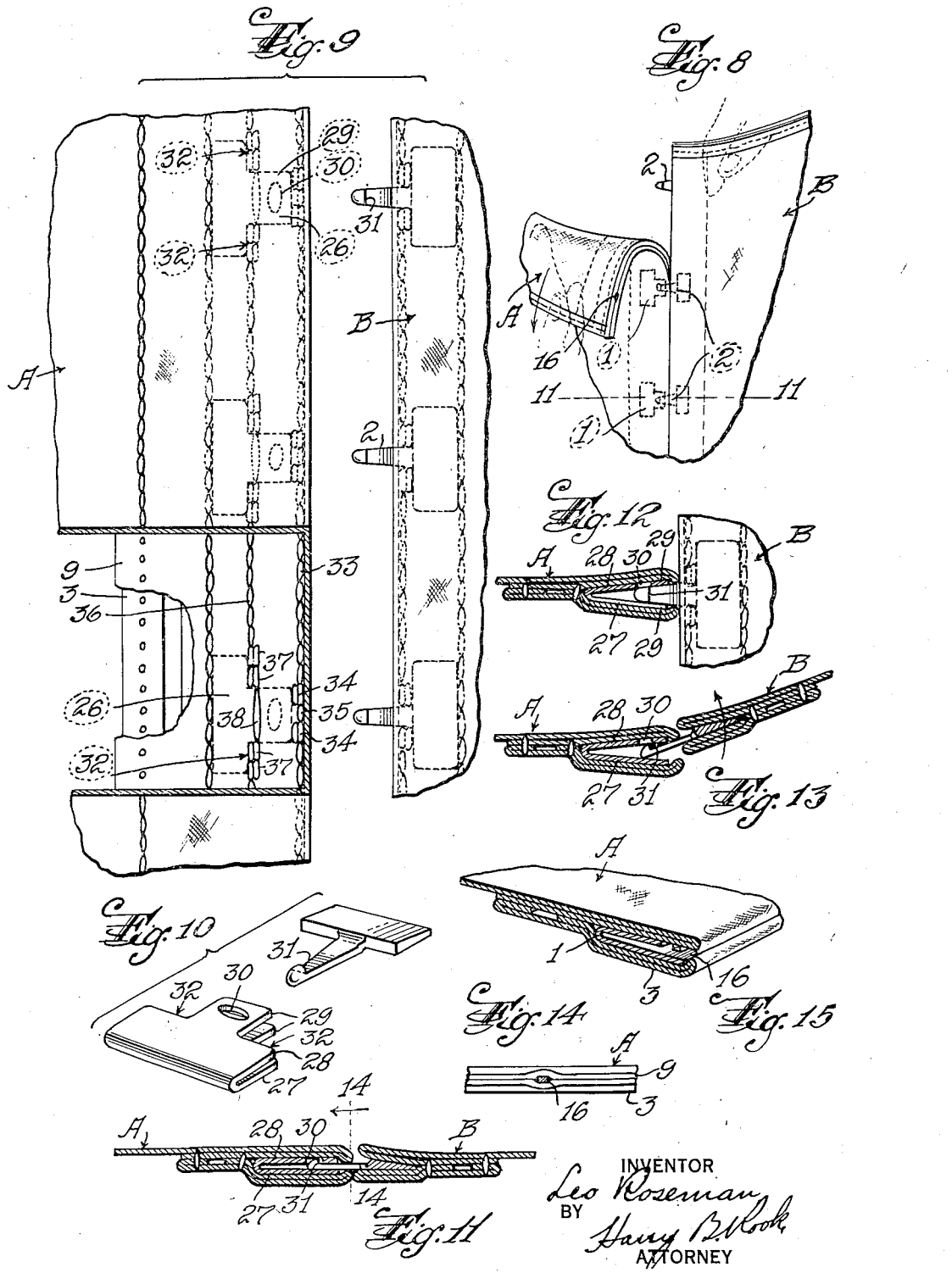
INVENTOR
Leo Roseman
BY
Harry B. Rook
ATTORNEY

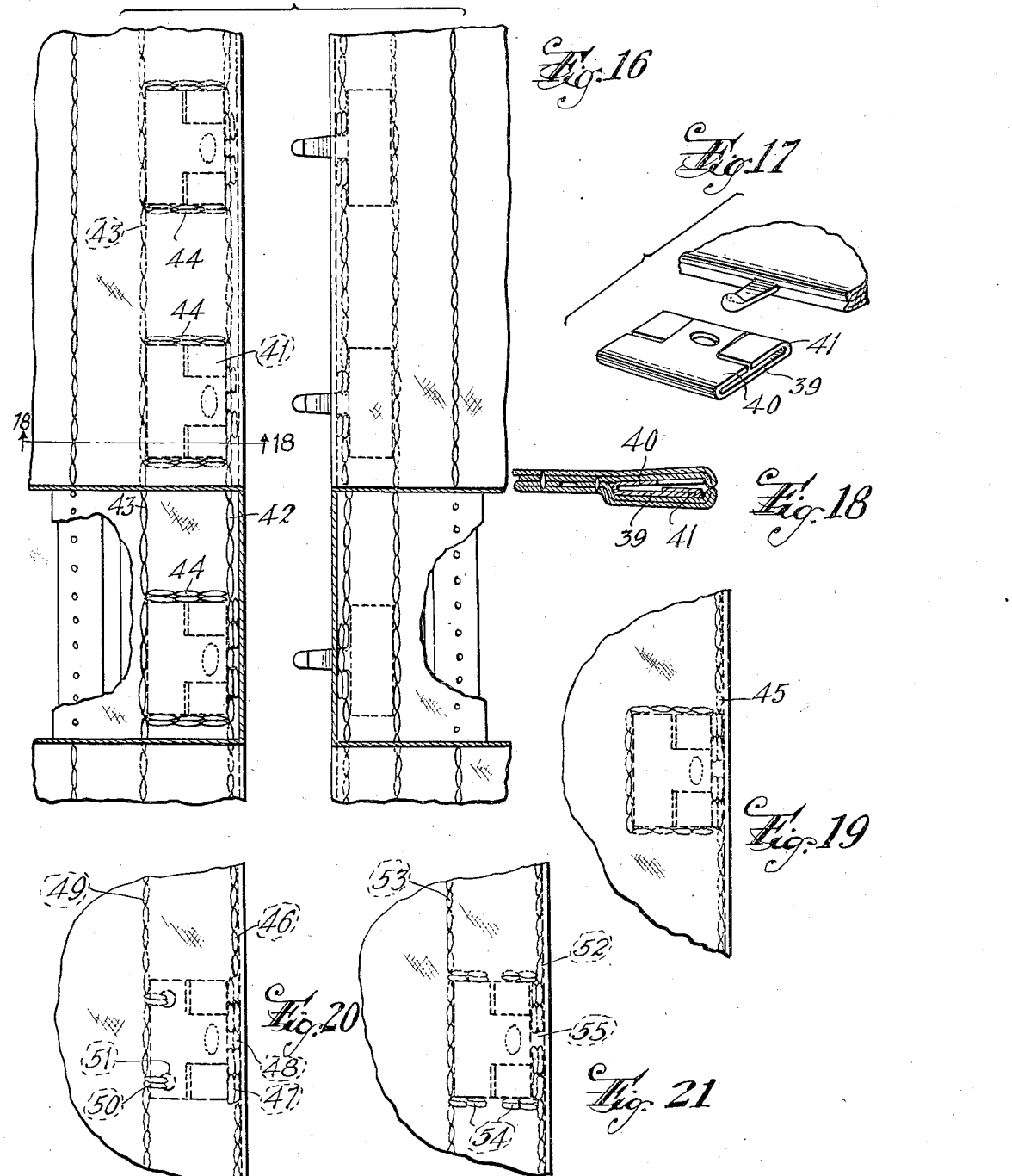

Patented Apr. 19, 1938

2,114,430

UNITED STATES PATENT OFFICE 2,114,430

LOCKING SNAP FASTENER

Leo Roseman, Newark, N. J.

Application December 2, 1936, Serial No. 113,815

2 Claims. (Cl. 2—265)

This invention relates in general to snap fasteners of the head and socket type, and particularly to such fasteners especially adapted for use on garments such as corsets, brassières, shirts, leggings, and surgical stockings, or on other articles such as garment bags, draperies and the like.

There are four common forms of separable fasteners. One type is a hook and eye wherein the common plane of the shank and the bill of the hook as well as the axis of the eye are perpendicular to the general plane of the edges of the article being connected and the hooks and eyes are connected and disconnected by a compound movement of the article edges in a direction parallel to the general plane of said edges and in a direction perpendicular to said general plane. Another type is the head and socket fastener wherein the head is held in the socket by spring frictional engagement and the axis of the head and socket is generally perpendicular to the general plane of the edges of the article, and said edges must be overlapped to connect the heads and sockets while the heads and sockets must be moved in planes perpendicular to the general planes of the edges of the article for connecting and disconnecting the heads and sockets. A third type is the so-called slide operated or zipper type which requires a slider for connecting and disconnecting the fastener elements. A fourth is the button and buttonhole type which requires overlapping of the edges of the article and insertion of the buttons through buttonholes.

The hook and eye type, the head and socket type and the button and buttonhole type have among other things the disadvantage of bulkiness and the forming of protuberances. Moreover, it is frequently difficult to connect and disconnect the complemental fasteners, and the complemental fasteners may become accidentally separated, the hooks and eyes when the edges of the article are not under tension and the heads and sockets when the edges are placed under too great a tension tending to separate them. Furthermore, the operation of connecting and disconnecting the complemental fasteners is slow and tedious. The zipper type causes puckering of the connected edges of the article, is frequently stiff due to the closely interlocking metal fasteners, and especially in tight fitting garments the slider is frequently difficult if not impossible to operate.

Moreover, the zipper and hook and eye fasteners must be heavily padded or have a flap to prevent injury to the body or underclothing which adds to the bulkiness and cost of manufacture; furthermore, the slider causes an objectionable protuberance.

The present invention is related to that shown and claimed in my co-pending application, Serial No. 106,326 filed October 19, 1936, which discloses a fastener for overcoming the above mentioned difficulties and disadvantages, wherein the complemental fastener elements are connectible in the general planes of the garment or article edges in a single movement in directions approximately perpendicular to said edges with the edges in approximately abutting relation, and the complemental fastener elements are positively locked against accidental disconnection. The fastener disclosed in that application also permits disconnection of all complemental fastener elements quickly at one time and in one simple relative movement or pulling apart of the edge portions of the garment or article from one end toward the other in directions at angles to the general planes of said edge portions similar to the movement incident to ripping or tearing of textile fabric.

The fastener disclosed in the above-mentioned co-pending application includes a stud element secured on one edge portion of the garment or article and a socket element secured on the other edge portion, the stud element being provided with a shank having a head formed with a lateral shoulder or projection, and the socket element comprising a single piece of spring sheet metal folded upon itself to form a pair of opposite spring jaws movable apart in a direction approximately perpendicular to the plane of the respective garment edge portion and one jaw formed with a recess or opening to recieve said shoulder of the hook element. Also the fastener elements are secured between plies of fabric stitched together, the opening between the jaws facing outwardly from the corresponding edge portion to receive the shank of the stud element.

A prime and important object of the present invention is to provide a fastener of the general character described having novel and improved means for securing the socket element between plies of fabric on the edge portion of the garment or article so the strains on the socket element during use of the fastener when the two elements are connected, shall draw the free edges of the jaws of the socket element into engagement with the stitched portions of the plies of material with a wedge action so as to force and hold the jaws in tight interlocking engagement with the hook element.

Another object of the present invention is to provide a fastener of this character wherein the socket element shall be secured to its corresponding garment edge portion by stitches and between plies of fabric so as to be wholly concealed and so that the engaging portions of the stud element and socket element when they are connected shall be disposed between stitches running longitudinally of the edge portion and in abutting relation to the socket element, whereby to provide a strong and durable attachment of the socket element to the garment or article, and the engaging portions of the stud and socket elements may be disposed in close proximity to the garment or article edges. Such a structure ensures that the complemental fastener elements may be easily and quickly separated by pulling apart of the edge portions of the garment or article from one end toward another in directions at angles to the general planes of said edge portions, and reduces the possibility of the fastener elements being torn from or dislocated on said edge portions; and also when the fastener elements are connected, no metal is exposed, and the edges of the garment or article may be brought into tight edgewise abutting relation to reduce visibility of the joint between the edge portions. Moreover, the necessity for an underlying apron or flap with its disadvantages are entirely eliminated; such a flap is costly, adds considerable bulk to the fastener, and usually turns under in use so that its purpose in protecting the body and garments from contact with the metal fasteners is defeated and annoyance to the wearer is created.

A further object is to provide a fastener of the general character described which shall include reenforcing stitches in abutting relation to the edges of the socket element in spaced relation along the opening between the jaws of the socket elements to ensure against the edges of the socket element projecting beyond the edge of the garment and to define a mouth for the reception of the shank of the complemental stud element.

Another object is to provide such a fastener embodying novel and improved features of construction of the stud elements and socket elements and means for securing them to the garment or article edge portions, whereby the fastener elements may be made small to ensure a maximum of flexibility of the garment edge portions and permit location of the engaging portions of the stud element and socket element when they are connected, close to the edge portions, whereby the elements may be separated in either of two ways, that is, by pulling apart the edge portions of the garment or article from one end toward the other in directions at angles to the general planes of the edge portions, or by manipulating the edge portions with a hinge-like action out of their planes to relatively tilt the fastener elements and withdraw the head of the stud element from the socket element.

A further object is to provide a fastener of this character embodying a novel and improved socket element and means for securing it between plies of fabric on a garment or article edge, whereby the surface at one side of the edge portion shall be smooth and free from bulges or protuberances and at least one surface for example, the outer surface, of the edge portions shall be flush with each other or in the same plane to form a smooth substantially continuous surface at the juncture of the two edges and thereby reduce visibility of the joint. Such a fastener may be used conveniently and effectually at places where it has been heretofore impractical to use fastener elements, for example in surgical stockings, or for connecting together sections of a garment for quick removal of the garment in place of the usual sewed seams.

Other objects to provide in such a fastener novel and improved means whereby easy, quick insertion of the stud element into the socket element and proper engagement of the stud with the opening in the jaw of the socket element, shall be ensured, and the possibility of the stud element being inserted between the socket element and the garment or article edge portion or becoming snagged on the edge portion or the socket element, shall be reduced; and to obtain other advantages and results as will be brought out by the following description.

Referring to the accompanying drawings in which corresponding and like parts are designated throughout the several views by the same reference characters.

Figure 1 is a composite plan view of the complemental socket element and stud element parts of the fastener in separated condition.

Figure 2 is a composite perspective view of the socket element and complemental stud element.

Figure 3 is a transverse vertical sectional view through the fastener with the stud elements and socket elements connected.

Figure 4 is a similar view showing the manner of separating the stud elements from the socket elements.

Figure 5 is a plan view of the parts shown in Figure 4.

Figure 6 is a sectional view on the line 6—6 of Figure 5.

Figure 7 is a sectional view through the fastener on the line 7—7 of Figure 1.

Figure 8 is a schematic perspective view of a fastener embodying my invention showing the manner of separating the complemental fastener elements.

Figure 9 is a view similar to Figure 1 showing a modification of the invention.

Figure 10 is a composite perspective view of the stud element and socket element shown in Figure 9.

Figure 11 is a transverse vertical sectional view through the fastener with the stud elements and socket elements connected, on the line 11—11 of Figure 8.

Figure 12 is a view similar to Figure 11 showing one manner of disconnecting the complemental stud elements and socket elements.

Figure 13 is a similar view showing another manner of disconnecting the fastener elements.

Figure 14 is a sectional view on the line 14—14 of Figure 11.

Figure 15 is a schematic sectional perspective view through the socket element part and one of the socket elements.

Figure 16 is a view similar to Figure 1 showing a further modification.

Figure 17 is a composite perspective view of the socket element and stud element shown in Figure 16.

Figure 18 is a sectional view on the line 18—18 of Figure 16.

Figure 19 is a fragmentary plan view of another modification of the socket element part, and Figures 20 and 21 are similar views of other modifications.

The invention contemplates the attachment of the complemental stud elements and socket elements directly to the edges of a garment or other article to be connected, or the attachment of the socket elements and stud elements to fabric tapes which are in turn secured to the edges of garments or other articles.

Referring to Figures 1 to 7 inclusive, the reference characters A and B designate the edge portions of a garment or article to be connected, said edge portions having secured thereto respectively socket elements 1 and stud elements 2. As shown, the fastener elements are secured between the undersides of the garment edge portions A and B and fabric strips 3, whereby the fastener elements are disposed between plies of fabric.

Each socket element includes a single piece of spring sheet material folded upon itself at 4 to form an approximately rectangular flat base having two opposed jaws 5 and 6 each of which has an opening, recess or catch 7 preferably registering with the opening in the other jaw adjacent the free edge of the jaw and intermediate its width.

Preferably, one jaw 6 is narrower than the other jaw so that the edges at the side of the element formed by said jaw 6 extend beyond the corresponding edges at the other side of the element for the purpose about to be described.

The socket elements are secured on the garment edges preferably in equi-distantly spaced relation longitudinally of said edges with the openings between the jaws facing toward the edge of the garment. The socket elements may be secured to the garment edge and strip in any suitable way, but preferably as shown the garment edge is folded under at 9 and a line of stitches 10 runs longitudinally of the garment edge in abutting relation to the forward or free edges 8 of the jaws of the socket elements and penetrates the strip 3 and the ply 9 of the garment edge, whereby the stitches are concealed by the main or upper portion of the garment edge. Preferably the line of stitches is formed to provide gaps between the garment edge portion and the strip in alinement with the openings 7 in the jaws of the socket elements of just sufficient size to receive the studs of the stud elements hereinafter to be described, there being superposed reenforcing stitches of sufficient number at opposite ends of the gaps. As shown, the stitches 10 run between the socket elements to a point at one side of the opening 7 of each element as at 11, then return upon themselves and pass around one end of the fastener element as at 12, then pass around the rear edge of the element or the edge opposite the free edges 8 of the jaws, as at 13, then around the other end of the element as at 14, then along the forward edges 8 as at 15 and the line then returning upon itself and running to the next fastener element. In this way, a gap 16 is formed between the garment edge portion and the strip 3 between the stitches 11 and 15, and the fastener element is firmly secured in position between the plies of fabric. The stitches snugly hug the respective edges of the fastener and are abutted by the forward edges 8 of the fastener so as to hold the elements against being pulled from between the garment edge portion and the strip.

Due to the jaw 6 being narrower than the jaw 5, when the socket element is stitched between the plies of fabric, the plies are drawn about the socket element, as shown in Figure 7, so that the plies overlying the wider jaw 5 are smooth and the socket elements do not form bulges or protuberances in said plies; substantially the entire bulge resulting from the fastener element is formed in the plies underlying the narrower jaw 6.

If desired the ends of the edge portions of the garment may be bound, as at C, to hold the under-ply 9 of the garment and the strip against unfolding from beneath the main portion of the garment, or stitches D may be used for the same purpose. However, due to the location of the strains on the fastener elements at the edges of the garment when connected, there is little or no tendency for the under-ply 9 to unfold in use.

If desired, tying stitches 17 may pass through openings 18 adjacent the rear edges of the fasteners to more securely attach the fastener elements to the fabric and prevent relative movement of the fabric plies and the socket elements in such a way as to throw the opening in the jaws of the socket element out of proper relation to the gap between the plies.

Each of the stud elements 2 includes a flat base 19 formed of suitable material and having a shank 20 projecting from one edge thereof with flat sides 21 and a rigid, rounded or bulbous head with a shoulder 22 projecting approximately perpendicular to the plane of the base 14 and to the plane of each flat side 21, said shoulders merging into the edges 23 of the shank. Also, the base 19 decreases in thickness from the base of the shank 20 to the rear edge for a purpose hereinafter set forth.

The bases of the stud elements are secured between the corresponding garment edge or the strip 3 in any suitable manner, for example in the same manner as the socket elements are secured, the shanks of the stud projecting from the garment edge through gaps formed by the stitches.

Each stud element is complemental to one socket element, and in connecting the complemental stud elements and socket elements, the garment edges are moved edgewise toward each other in their own planes so as to insert the stud shanks between the jaws of the corresponding socket elements, the jaws being sprung apart as the stud shanks are inserted and then snapping over the shoulders 22 to cause interlocking engagement of the edges of the openings 7 with the respective shoulders 22. The stud elements and socket elements are thereby positively interlocked with each other and when thus connected together, the complemental stud elements and socket elements will effectually withstand all strains tending to pull the edges apart in their own planes, which is especially important in tight-fitting garments such as corsets.

The connection of the complemental fastener elements can be effected easily and quickly, the gaps 16 effectually guiding the stud shanks between the jaws of the socket elements. The stitches 10, 44, etc., draw the folded edges of the fabric plies tightly around the edges of the socket elements so as to form rounded gaps or mouths, the round edges of the folds guiding the stud shanks into the mouths of the socket elements.

The complemental socket elements and stud elements may be separated in a continuous operation by oppositely directed forces on the garment edges from one end toward the other in directions at angles to the planes of said edges so as to relatively rotate the socket elements and stud elements about axes parallel to the general planes of the garment edges and move the shoulders 22 of the stud elements out of the recesses 7 of the corresponding socket elements, as shown in Figures 4 and 8. This relative movement of the garment edges during separation of the fastener elements is similar to that of ripping fabric or a seam as clearly shown in Figure 8, and permits easy and rapid disconnection of the garment edges. This is especially desirable in tight fitting garments such as corsets because only one edge need be pulled, the other edge being held stationary by the body. The fastener elements when connected are held against such rotation by the garment edge portions and the engagement of the jaws 5 and 6 with the flat sides 21 of the hook shanks.

A highly important feature of the invention is that during use of the fastener with the fastener elements connected, strains on the socket elements in the planes of the garment edges tending to separate said edges, will draw the free edges of the jaws 5 and 6 of the socket elements with a wedge action into engagement with the plies of fabric between which the socket elements are mounted, so as to tightly force the jaws into interlocking relation with the corresponding stud elements. Also, when the fastener elements are connected, all metal is concealed, and the two edge portions A and B may be brought into tight abutting relation so as to avoid the necessity for an underlying apron or flap with its disadvantages and annoyances. Moreover, the fastener elements are small and compact so as to insure a maximum of flexibility of the garment edge portions and permit location of the engaging portions of the stud elements and socket elements when they are connected, close to the edge portions and in close proximity to the holding stitches so that there is a minimum of tendency to tear or dislocate the fastener elements from the fabric upon separation of the complemental fastener elements. Also, the garment edge portions when they are connected, have their outer sides or faces smooth and free from bulges and in substantially the same plane or flush with each other so as to reduce the visibility of the joint between the edges, as shown in Figure 3. It will be noted that the tapered bases of the stud element ensure a flush meeting of the other surfaces of the edge portions and also provide a minimum of bulk in the edge portion carrying the stud elements.

To reenforce the forward edges of the fastener elements and provide thickened or rounded edges to avoid undue wear on the fabric plies, the edges of the jaws may be returned as shown at 24, in Figure 1, and the edges of the returned portions may be flush with the edges of the corresponding openings 7 as at 25 to provide a double thickness of metal for engagement with the shoulders 22 of the stud element. This thickened edge on the jaw in conjunction with the narrow jaw 6 and the stitching of the plies, further ensures the fabric being pulled tightly about the edges of the jaws so that said edges are wholly behind the edges of the fabric plies and covered thereby, whereby possibility of the stud element entering accidentally between the fastener element and the plies is obviated. The bluntly rounded head of the stud element also serves to guide the stud shank into the gap between the fabric plies.

A modification of the invention is shown in Figures 9 to 15 inclusive wherein each socket element 26 is formed of a single piece of spring sheet metal folded upon itself to provide opposed spring jaws 27 and 28 each of which has a tongue 29 in one of which is formed an opening 30 to cooperate with the shoulder 31 of the complemental stud element. This stud element is the same as that shown in Figures 1 to 5 inclusive, except that only one shoulder is included instead of two shoulders.

With this construction, the socket element has a shoulder 32 at each side of each tongue 29 to abut stitches for holding the socket element in position.

As shown, the socket elements are secured between the garment edge portion A and a strip 3 as shown in Figures 1 to 5 inclusive with a line of stitches 33 running along the edge similar to the stitches 10 and formed with reenforcing stitches 34 in abutting relation to the free ends of the tongues 29. One set of reenforcing stitches 34 is disposed at each side of the tongues and a jump stitch 35 connects the reenforcing stitches to form a gap between the reenforcing stitches for the entrance of the stud shank of the complemental stud element for connection with the corresponding socket element. Another line of stitches 36 is in abutting relation to the shoulders 32 and includes tying stitches 37 in juxtaposition to the shoulders, and a jump stitch 38 providing a gap through which the tongues 29 are inserted.

The operation of this form of fastener is the same as that hereinbefore described, except that the complemental stud and socket elements may also be separated by a relative tilting of the fastener elements with a hinge-like action out of their planes as shown in Figure 13, in addition to separation of the fastener elements by relative rotation of the elements as shown in Figure 12. The separation as shown in Figure 13 is made possible by the location of the engaging portions of the studs and socket elements close to the edge of the garment or article so that relative tilting of the fastener elements does not unduly separate the jaws of the socket elements.

A further modification of the invention is shown in Figures 16 to 18 inclusive wherein the socket elements are the same as those shown in Figure 9 except that one jaw 39 is longer than the other jaw 40 and has its free edge returned at 41 to provide a smooth shoulder for abutment with the fabric and stitches.

The fastener elements are secured between the garment edge portion and the strip by a line of stitches 42 corresponding to the line 33, and another line of stitches 43 which runs along the rear edge of the socket elements and has transverse stitches 44 running along the ends of the socket elements. The socket elements are thus completely surrounded by stitches.

Another modification is shown in Figure 19 where the socket elements are surrounded by stitches 45 in the same manner as shown in Figure 1.

Figure 20 shows another form of the invention wherein the socket elements are secured in position by a line of stitches 46 running along the edge of the garment or article and in abutting relation to the forward edges of the socket element with reenforcing stitches 47 and a jump stitch 48 forming a reenforced gap for the entrance of the corresponding hook element between the jaws of the socket element. Another line of stitches 49 runs along the rear edge of the socket element and has tying stitches 50 passing through openings 51 in the socket element.

In Figure 21 there is a line of stitches 52 at the forward edge of the socket element and another line of stitches 53 at the rear edge of the socket element, each line having transverse stitches 54 running along the ends of the socket elements, and the line of stitches 52 forming a gap 55 for the entry of the stud element between the jaws of the socket element.

It will be observed that in all forms of the invention a gap or opening is formed in the edge of the garment or article for each socket element in alinement with the opening in the jaw of the socket element and of just sufficient size to permit entrance of the stud shank, the gap being reenforced by the stitches which prevent the fastener element from being pulled through the gap and hold the fabric plies firmly against separation, whereby the stud element will be accurately guided into the opening in the jaw of the socket element with little possibility of the stud element becoming caught or snagged between the plies of fabric or between the fabric and socket element.

If desired the fastener elements may be mounted on tapes, each of which will include two strips of fabric corresponding respectively to the garment edge portion A or B and the strip 3.

Other modifications in the details of structure of the fastener elements and in the manner of securing them to the garment edge, article or tape, will occur to those skilled in the art as within the spirit and scope of the invention.

Having thus described my invention, what I claim is:

1. In a fastener the combination of two pieces of material having their edges disposed in approximately edgewise abutting relation, a stud element secured on one of said pieces with a head projecting from the edge of said piece, the other piece comprising a plurality of plies connected together at one edge, and a socket element between two adjacent plies of the second-mentioned piece and comprising a pair of spring jaws forming a mouth between their free ends opening between said plies at said edge of the corresponding piece to receive and interlock with said head, the free ends of said jaws engaging said adjacent plies adjacent the connection of said plies so that strains incident to use of the fastener when the stud element and socket element are connected will cause a wedge action between said jaws and said adjacent plies to force said jaws toward each other into tight engagement with the stud of said stud element.

2. In a fastener, a piece of material including a plurality of plies, an approximately flat separable fastener element arranged between two adjacent plies, there being an opening in said piece to permit cooperation of said fastener element with a complemental fastener element, the edges of said fastener element at one side of the element extending beyond the corresponding edges at the other side, and stitches penetrating said adjacent plies adjacent said edges of the fastener element and drawing the plies tightly around said element to prevent the formation of a bulge by said element at one side of said piece and make said side approximately smooth and flat.

LEO ROSEMAN.